United States Patent
Schwarz

(10) Patent No.: US 10,421,237 B2
(45) Date of Patent: Sep. 24, 2019

(54) SONOTRODE FOR AN ULTRASOUND WELDING SYSTEM AND METHOD FOR WELDING A CONNECTION ELEMENT TO A COMPONENT

(71) Applicant: REHAU AG + CO., Rehau (DE)

(72) Inventor: Ralph Schwarz, Gunzenhausen (DE)

(73) Assignee: Rehau AG + Co., Rehau (DE)

( * ) Notice: Subject to any disclaimer, the term of this patent is extended or adjusted under 35 U.S.C. 154(b) by 191 days.

(21) Appl. No.: 15/555,536

(22) PCT Filed: Mar. 15, 2016

(86) PCT No.: PCT/EP2016/000454
§ 371 (c)(1),
(2) Date: Sep. 4, 2017

(87) PCT Pub. No.: WO2016/146252
PCT Pub. Date: Sep. 22, 2016

(65) Prior Publication Data
US 2018/0043625 A1 Feb. 15, 2018

(30) Foreign Application Priority Data
Mar. 16, 2015 (DE) .................. 10 2015 103 799

(51) Int. Cl.
*B32B 37/00* (2006.01)
*B29C 65/78* (2006.01)
(Continued)

(52) U.S. Cl.
CPC .......... *B29C 65/7811* (2013.01); *B29C 65/08* (2013.01); *B29C 65/7838* (2013.01);
(Continued)

(58) Field of Classification Search
CPC . B29C 65/08; B29C 65/7811; B29C 65/7838; B29C 65/7844; B29C 66/112;
(Continued)

(56) References Cited

U.S. PATENT DOCUMENTS 6,309,490 B1  10/2001  Davis et al.
2014/0231020 A1 *  8/2014  Scheu ............... B29C 66/24221
                                                                156/378

FOREIGN PATENT DOCUMENTS

DE  102009019644  11/2010
DE  102010000968   7/2011
(Continued)

OTHER PUBLICATIONS

International Search Report dated Jul. 8, 2016.
(Continued)

*Primary Examiner* — James D Sells
(74) *Attorney, Agent, or Firm* — Preston Smirman; Smirman IP Law, PLLC

(57) ABSTRACT

The invention relates to a sonotrode for an ultrasound welding system for welding workpieces (20, 30), comprising a pressure element (2) which has a contact surface, which pressure element can be applied to carry out the welding process with said contact surface on one of the workpieces (20) to be welded to each other, wherein the contact surface has an annular design. A centering pin axially projecting over the contact surface is arranged inside the annular contact surface. The invention also relates to a method for welding a connection element (20), in particular an adapter for a PDC sensor, to a component (30), in particular an exterior add-on part of a motor vehicle.

6 Claims, 4 Drawing Sheets

(51) Int. Cl.
    *B29C 65/08*     (2006.01)
    *B29C 65/00*     (2006.01)
    *B29L 31/00*     (2006.01)
    *B29L 31/30*     (2006.01)

(52) U.S. Cl.
    CPC ........ *B29C 65/7844* (2013.01); *B29C 66/112* (2013.01); *B29C 66/1122* (2013.01); *B29C 66/131* (2013.01); *B29C 66/24221* (2013.01); *B29C 66/474* (2013.01); *B29C 66/53241* (2013.01); *B29C 66/61* (2013.01); *B29C 66/81431* (2013.01); *B29C 66/8322* (2013.01); *B29L 2031/3044* (2013.01); *B29L 2031/737* (2013.01)

(58) Field of Classification Search
    CPC ............... B29C 66/1122; B29C 66/131; B29C 66/24221; B29C 66/474; B29C 66/53241; B29C 66/61; B29C 66/81431; B29C 66/8322
    USPC ........................................................ 156/73.1
    See application file for complete search history.

(56) References Cited

FOREIGN PATENT DOCUMENTS

| | | |
|---|---|---|
| DE | 102014212313 | 12/2015 |
| EP | 2769830 | 8/2014 |
| EP | 2873512 | 5/2015 |

OTHER PUBLICATIONS

English Translation of International Search Report dated Jul. 8, 2016.
Written Opinion of the International Searching Authority dated Jul. 8, 2016.
English Translation of Written Opinion of the International Searching Authority dated Jul. 8, 2016.
International Preliminary Report on Patentability dated Sep. 19, 2017.
English Abstract of DE102009019644.
English Abstract of DE102010000968.
English Abstract of EP2769830.
Machine Translation of English Abstract of DE102014212313.
Machine Translation of English Abstract of EP2873512.

\* cited by examiner

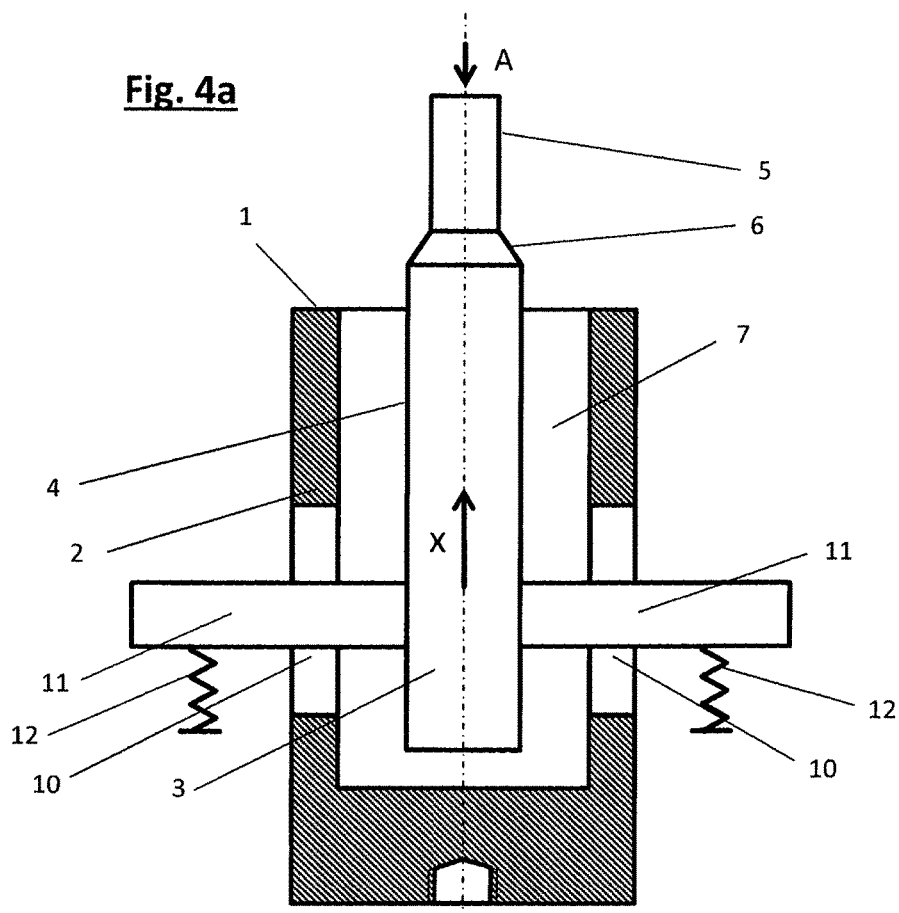
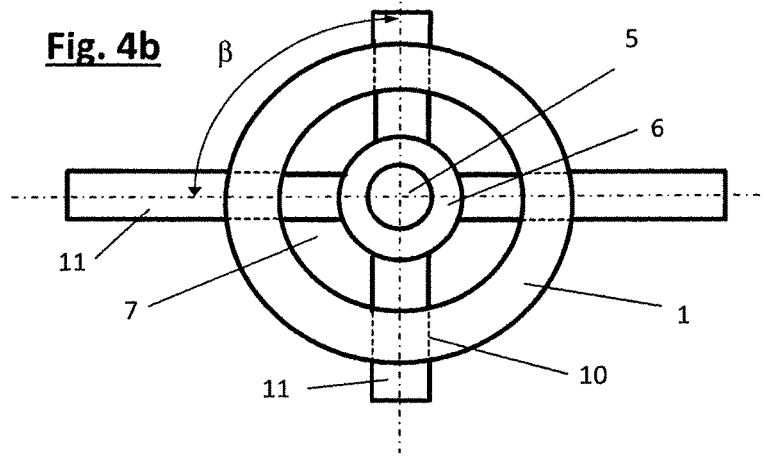

SONOTRODE FOR AN ULTRASOUND WELDING SYSTEM AND METHOD FOR WELDING A CONNECTION ELEMENT TO A COMPONENT

CROSS-REFERENCE TO RELATED APPLICATION

The instant application is a national phase of PCT International Application No. PCT/EP2016/000454 filed Mar. 15, 2016, and claims priority to German Patent Application Serial No. 102015103799.8, filed Mar. 16, 2015, the entire specifications of both of which are expressly incorporated herein by reference.

The invention relates to a sonotrade for an ultrasonic welding plant for welding workpieces, comprising a pressing element which has a contact surface and may be applied with this contact surface to one of the workpieces to be welded to one another, wherein the contact surface is ring-shaped.

Such a sonotrode is known, for example, from DE 10 2010 000 968 A1. Ultrasonic welding is a method which is particularly suitable for material-to-material connection of components made of thermoplastics.

In this case, one component or both of the components to be connected are melted at the welding point by the generation of heat. This melting is caused by a high-frequency mechanical vibration of the ultrasonic sonotrode. The heat required for melting is produced between the components due to the frictional effects caused by the high-frequency oscillation.

Sonotrodes of this kind are used, for example, for the connection of so-called PDC sensors (PDC=Park Distance Control) to exterior components (for example, bumpers) of motor vehicles. The PDC sensors are generally used as parking aids or as distance monitors.

The PDC sensors are usually mounted in adapters connected to the exterior component in order to ensure accurate positioning of the sensor on the exterior component of the motor vehicle. These adapters are now regularly welded to the exterior components by ultrasonic sonotrodes from the inside. In the prior art, the adapters for PDC sensors are, for example, welded to the exterior component by means of two rod sonotrodes, wherein the connection of the adapters takes place via two welding laps. In the case of such a welding connection, however, the strength is significantly limited by a physical peeling effect. With the aid of an ultrasonic ring sonotrode, a continuous weld may now be achieved with a significantly reduced peeling effect, while, at the same time, there is an advantageous small penetration depth of the welding knobs. Due to the low penetration depth, the welding area is also subjected to a relatively low thermal load, which in turn is reflected in a reduction in welding marks.

In the case of adapters which do not penetrate through the exterior component (for example, the plastic bumper), the adapter is centered with respect to the exterior component. This is ensured according to the prior art via a separate centering recess. Such a centering device is unproblematic when using the above-mentioned rod sonotrodes. On the other hand, this is not the case with a ring sonotrode because the centering device may adversely affect the vibration behavior of the ring sonotrode. In order to achieve decoupling between the sonotrode and the centering device in the case of ring-type sonotrodes, according to the prior art, the ring sonotrode is opened laterally. The centering for the adapter is connected externally via this opening and held in the center of the ring sonotrode. However, an open ring sonotrode provides for a poorer weld compared with a closed ring sonotrode. Furthermore, the described method for ensuring the centering is comparatively complex.

Against this background, the invention is based on the task of specifying a sonotrode having the features described at the outset which, on the one hand, permits an exact centering of the workpieces to be welded to one another in a reliable and simple manner, while, on the other hand, ensuring high strength welding.

This object is achieved according to the invention wherein a centering mandrel protruding axially over the contact surface is arranged on the pressing element within the ring-shaped contact surface. Preferably, the centering mandrel is arranged, in particular fixed, on the pressing element. By means of the centering mandrel according to the invention in the center of the sonotrode, it is possible to center both workpieces to be welded together with respect to the sonotrode, as a result of which both workpieces are exactly centered with respect to one another. According to the teaching of the invention, therefore, the expensive method steps or constructions which are necessary in the above-described prior art may be dispensed with. At the same time, there are no design restrictions with respect to the contact surface in the sonotrode when using the sonotrode according to the invention, as a result of which optimum welding may be ensured.

According to a preferred embodiment of the invention, the contact surface has a closed ring shape. Due to the centering mandrel in the center of the ring-shaped contact surface, it is not necessary to open the circumferential contact surface at one point in order to be able to produce a web for a centering holder. Instead, as already described above, the centering of both the first and the second workpiece partners takes place via the centering mandrel, so that the two workpieces and the ring sonotrode are all exactly centered with respect to one another. Therefore, the centering mandrel is expediently arranged concentrically to the ring-shaped contact surface.

The circumferential surface of the centering mandrel forms a preferably cylindrical centering surface. According to the teaching of the invention, the first workpiece may be pushed onto this circumferential surface, wherein a corresponding recess in this workpiece accepts the centering mandrel in a precisely-fitting manner. This first workpiece is thus centered with respect to the centering mandrel and thus with respect to the sonotrode. Advantageously, the centering mandrel additionally has a centering tip which is tapered towards the centering surface and is preferably cylindrical. On this centering tip, the second workpiece, which also has a corresponding opening designed to fit the centering tip, may then be centered with respect to the centering mandrel and thus the sonotrode. Within the scope of the invention, however, it is self-evident that the centering tip is not tapered with respect to the described centering surface, in particular the centering tip and the centering surface do not have a transition into one another. In this case, the recess in the first workpiece and the opening in the second workpiece must have an identical size, so that the centering mandrel is both in register with the recess and in register with the opening. It is also within the scope of the invention that, in the case of a tapered centering tip, it, and the centering surface, are connected to one another by a preferably conical transition section.

According to a preferred embodiment of the invention, the pressing element has a cylindrical cavity within which the centering mandrel is arranged. According to a particularly preferred embodiment of the invention, the wall of the pressing element forms the ring-shaped contact surface on the end face. In principle, the centering mandrel may be screwed on the bottom side with the pressing element.

The object of the invention also relates to a method for welding a connection element, e.g. a holder, in particular an adapter for a PDC sensor, to a component, e.g. a plastic component, in particular an exterior component of a motor vehicle, by means of the sonotrode described above. In the method according to the invention, the connection element comprising a recess is first pushed onto the centering mandrel and thus centered relative to the sonotrode. Preferably, the recess is designed in a correspondingly precise manner to the centering surface of the centering mandrel. Then, the tip of the centering mandrel passes through an opening in the component, as a result of which the sonotrode is centered relative to the component. Expediently, the opening in the component is formed to exactly fit the centering point. The contact surface of the sonotrode is brought into contact with the side of the connection element facing away from the component. The connecting element is then welded to the component by means of the sonotrode. Due to the centering of both the connection element and the component opposite the centering mandrel, it is ensured that the connection element and component may lie exactly adjacent to each other, and may be welded to one another in a corresponding manner.

According to a further embodiment of the invention, the centering mandrel is decoupled from the pressing element, i.e. it is not fixedly connected to it. In this case, the pressure element comprises at least one recess on the circumference. Preferably, this recess is spaced apart from the contact surface. As a result, the contact surface may also have a closed ring shape in this embodiment. A holder to which the centering mandrel is attached passes through the at least one recess. The holder is preferably oriented transversely, in particular perpendicular to the centering mandrel. For example, at least two recesses which are aligned with one another may be provided, i.e. they are offset with respect to one another by 180° on the circumference of the pressing element. Advantageously, the holder radially centers the centering mandrel relative to the pressing element. For this purpose, for example, the holder may be cross-shaped and correspondingly may pass through four recesses in the pressing element, which are offset by 90° to each other around the circumference of the pressing element.

In the following, the invention is explained in detail with reference to a drawing which is merely illustrative and schematic:

FIG. 1b shows the top view A of FIG. 1a,

Figure 1A:
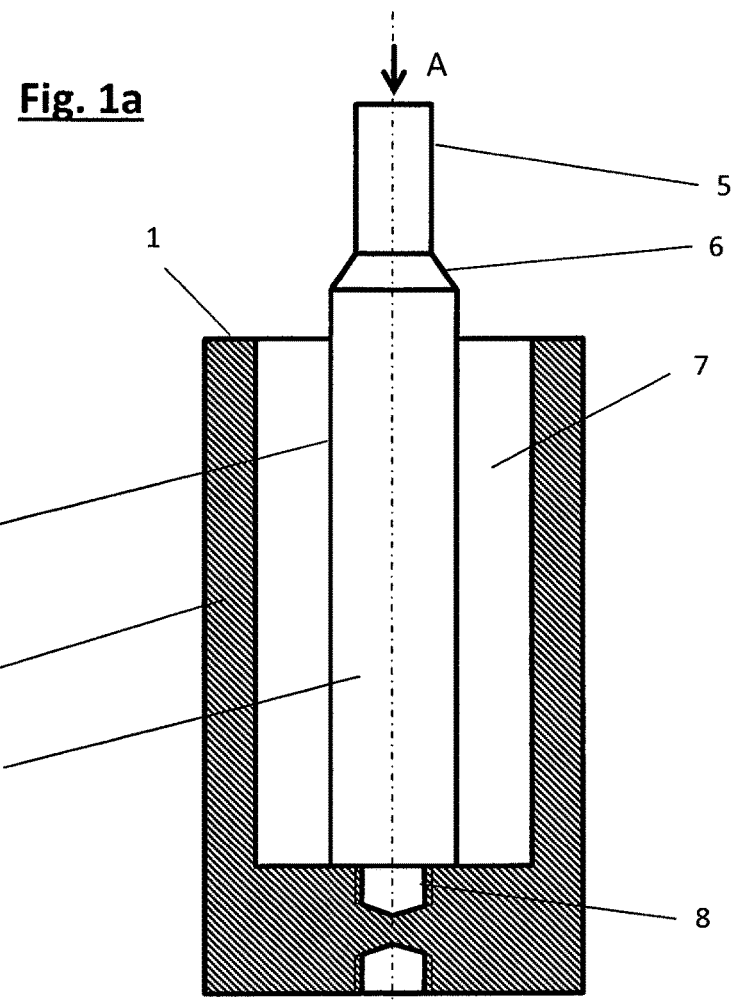
FIG. 1a shows a sonotrode according to the invention in cross-section
Figure 1B:
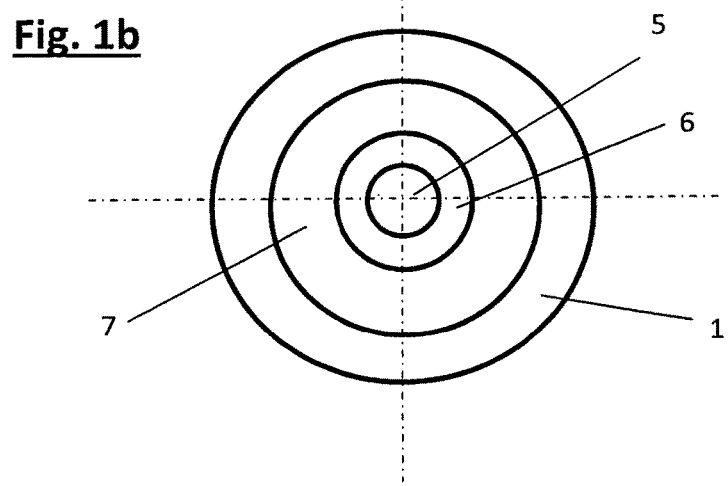

FIGS. 1a and 1b show a sonotrode for an ultrasonic welding plant for welding workpieces 20, 30. The sonotrode comprises a pressing element 2 having a contact surface 1 which, for carrying out the welding operation, is provided with this contact surface 1 which is applied to the workpieces 20 to be welded together (cf. FIG. 2c). The contact surface 1 is ring-shaped. As may be seen in FIGS. 1a,b, a centering mandrel 3 projecting axially over the contact surface 1 is arranged on the pressing element 2 within the ring-shaped contact surface 1. It may be seen from FIG. 1b that the contact surface 1 has a closed ring shape. FIG. 1b also shows that the centering mandrel 3 is arranged concentrically to the ring-shaped contact surface 1. The circumferential surface 4 of the centering mandrel 3 forms a cylindrical centering surface in the exemplary embodiment. The centering mandrel 3 also has a cylindrical centering tip 5 which is tapered with respect to the centering surface 4. The centering tip 5 and the centering surface 4 are connected to each other by a conical transition section 6. The pressing element 2 has a cylindrical cavity 7 within which the centering mandrel 3 is arranged. The wall of the pressing element 2 here forms the ring-shaped contact surface 1 on the end face. FIG. 1a also shows that the centering mandrel 3 is screwed to the pressure element 2 on the bottom side. Correspondingly, a thread 8 is provided within the cavity 7.

FIGS. 2a to 2d show a method according to the invention for welding a connection element 20 to a plastic component 30. In the exemplary embodiment, the connection element 20 is a plastic adapter for a PDC sensor (not shown) and the plastic component 30 is an exterior component of a motor vehicle, for example a bumper made of injection-molded plastic. The method is carried out with the sonotrode described in FIGS. 1a,b.

Figure 2A:
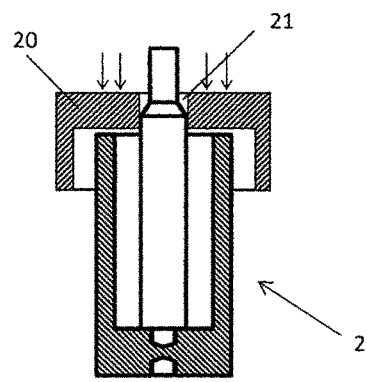
FIGS. 2a to 2d show a method according to the invention for welding a connection element with a plastic component, and FIGS. 3a,b; 4a,b show further embodiments of the invention in a representation corresponding to FIGS. 1a, b.
Figure 2B:
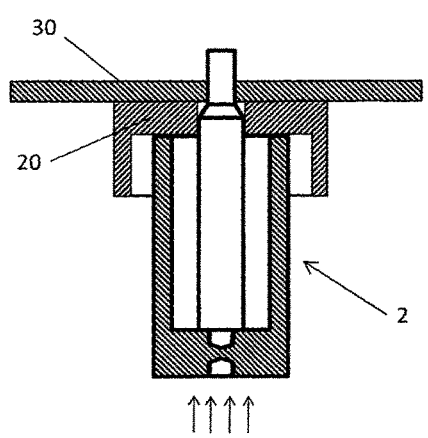

According to FIG. 2a, first the connection element 20 comprising a recess 21 is pushed onto the centering mandrel 3 and thus centered relative to the sonotrode. The recess 21 is designed to fit exactly on the centering surface 4 of the centering mandrel 3. According to FIG. 2b, the tip of the centering mandrel 3 then passes through an opening 31 in the plastic component 30, wherein the sonotrode is centered relative to the plastic component 30. Correspondingly, the opening 31 is designed to fit the cylindrical centering point 5 exactly. Before welding, the contact surface 1 of the sonotrode is brought into contact with the side 22 of the connection element 20 facing away from the plastic component 30.

Figure 2C:
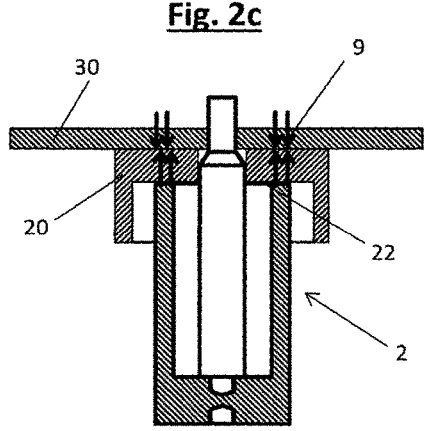
Figure 2D:
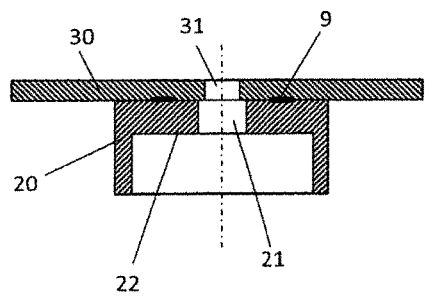

According to FIG. 2c, the connection element 20 is then welded to the plastic component 30 by means of the sonotrode, wherein a circumferentially-closed ring-shaped weld 9 is formed. FIG. 2d shows the two workpieces 20, 30 welded together, i.e. the connection element 20, on the one hand, and the plastic component 30, on the other hand, after removal of the sonotrode. Due to the described welding method with the centering mandrel 3, both parts 20, 30 are exactly centered relative to one another. The closed ring-shaped weld 9 may also be seen in FIG. 2d.

Figure 3A:
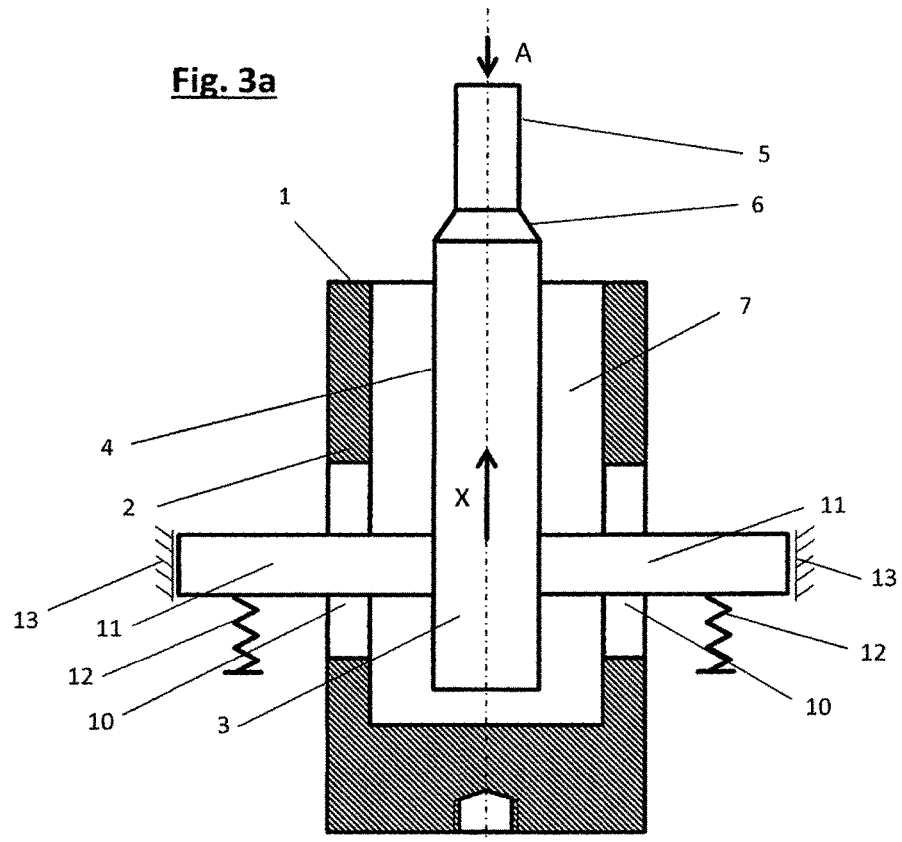
Figure 3B:
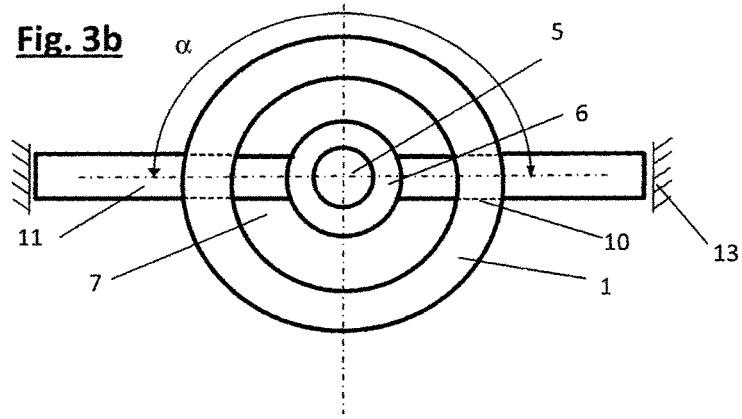

In the case of the embodiment according to FIG. 3a,b, the centering mandrel 3 is decoupled from the pressing element 2, i.e. it is not fixedly-connected to it. In this case, the pressing element 2 has two recesses 10 spaced apart from the contact surface 1. These slot-shaped recesses 10, which are aligned in the axial direction x, are passed through by a holder 11 which is oriented perpendicular to the centering mandrel 3 and to which the centering mandrel 3 is fastened. In the exemplary embodiment, the recesses 10 are aligned with one another, i.e. they are offset with respect to one another at the circumference of the pressing element by α=180°. The construction according to FIG. 3a,b is designed in such a way that the holder 11 radially centers the centering mandrel 3 with respect to the pressing element 2. FIG. 3a also shows that the rod-shaped holder 11 is spring-loaded in the axial direction x by means of spring elements 12 and is thus mounted in a floating manner. In this way, differences in height and an offset during the joining between the plastic component 30 and the connection element 20 may be compensated for. This ensures that the connection element 20 is always centered with respect to the opening 31 in the plastic component 30 without damaging the opening 31 or the plastic component 30. In order to ensure the radial centering of the centering mandrel 3, the holder is guided in the recesses 10 without any play. In addition, lateral guide elements 13 for guiding the ends of the holder 11 are additionally provided.

The embodiment according to FIGS. 4a,b differs from the embodiment in FIGS. 3a,b in that the holder 11 has a cross-shaped configuration to ensure the radial centering of the centering mandrel 3 (see top view in FIG. 4b). Correspondingly, four recesses 10 are provided in the pressing element 2, in which the cross-shaped holder 11 is guided without any play in the axial direction x. The recesses 10 are arranged offset at the circumference of the pressing element 2 by the respective angle β=90°.

The invention claimed is:

1. A sonotrode for an ultrasonic welding plant for welding workpieces, comprising:
   a pressing element that has a contact surface, and is used for carrying out the welding process with the contact surface on one of the workpieces, wherein the contact surface is ring-shaped in form;
   a centering mandrel projecting axially over the contact surface and being arranged within the ring-shaped contact surface;
   wherein the centering mandrel is arranged or fixed on the pressing element;
   wherein the contact surface has a closed ring shape;
   wherein the centering mandrel is arranged concentrically to the ring-shaped contact surface;
   wherein a circumferential surface of the centering mandrel forms a cylindrical centering surface; and
   wherein the centering mandrel comprises a cylindrical centering point that is tapered with respect to the centering surface.

2. The sonotrode according to claim 1, wherein the centering tip and the centering surface are connected to each other by a conical transition section.

3. The sonotrode according to claim 2, wherein the pressing element has a cylinder-shaped cavity within which the centering mandrel is arranged.

4. The sonotrode according to claim 3, wherein a wall of the pressing element forms the ring-shaped contact surface on an end face thereof.

5. The sonotrode according to claim 4, wherein the pressing element comprises at least one recess on a circumference thereof, that is spaced apart from the contact surface and which is passed through by a holder that is fixed to the centering mandrel and is oriented transverse to the centering mandrel.

6. A method for welding a connection element, comprising the steps of:
   providing a sonotrode according to claim 5;
   providing a component, wherein the component is an exterior component of a motor vehicle;
   wherein the connection element comprises a recess that is pushed onto the centering mandrel and is thus centered relative to the sonotrode;
   wherein the tip of the centering mandrel is passed through an opening in the component, thus centering the sonotrode relative to the component;
   wherein the contact surface of the sonotrode is brought into abutment against the side of the connection element remote from the component; and
   wherein the connection element is welded to the component by means of the sonotrode.

* * * * *